July 11, 1944.  E. J. BEACH  2,353,138
OIL, MOISTURE, AND GAS SEPARATOR
Filed July 18, 1942  3 Sheets-Sheet 1
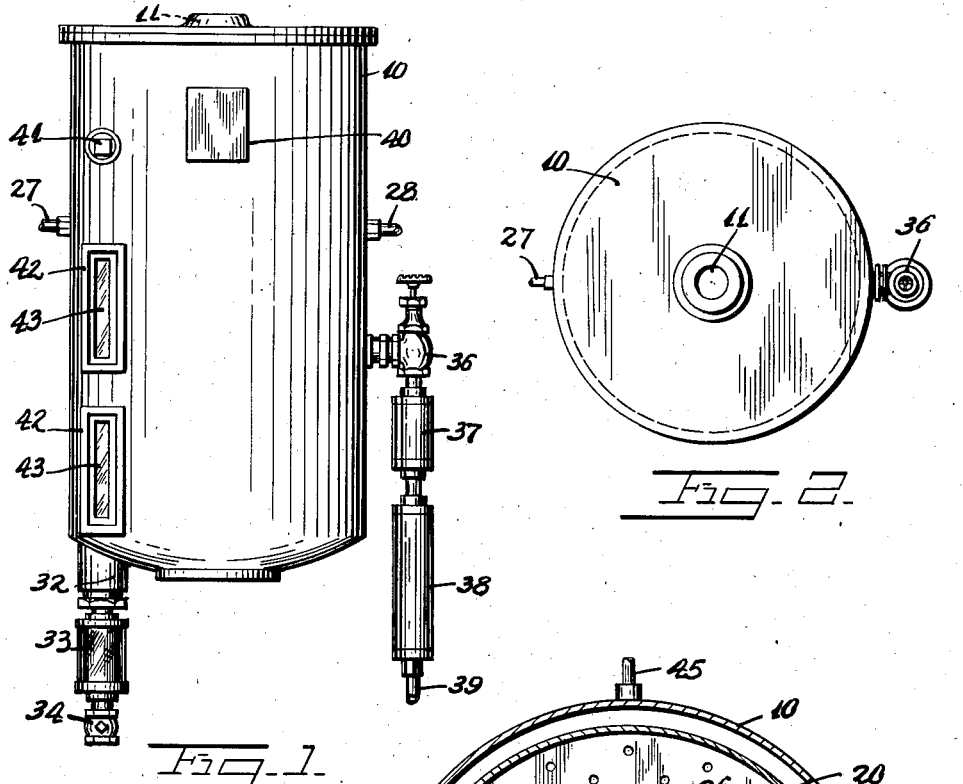
Fig. 1.
Fig. 2.
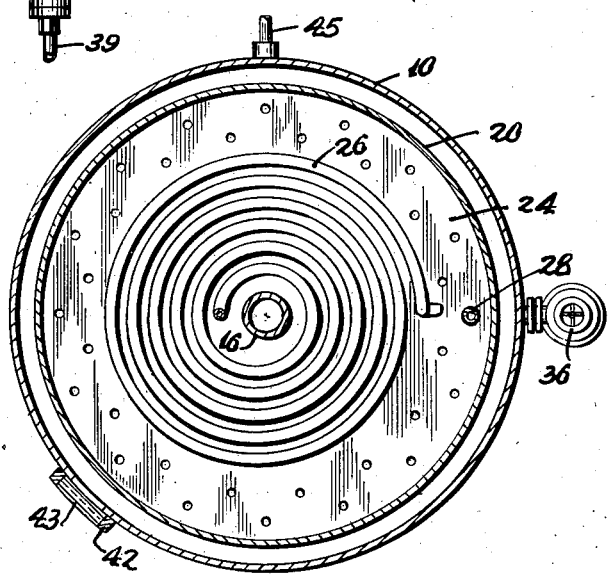
Fig. 5.
INVENTOR.
Edward J. Beach
BY
ATTORNEY

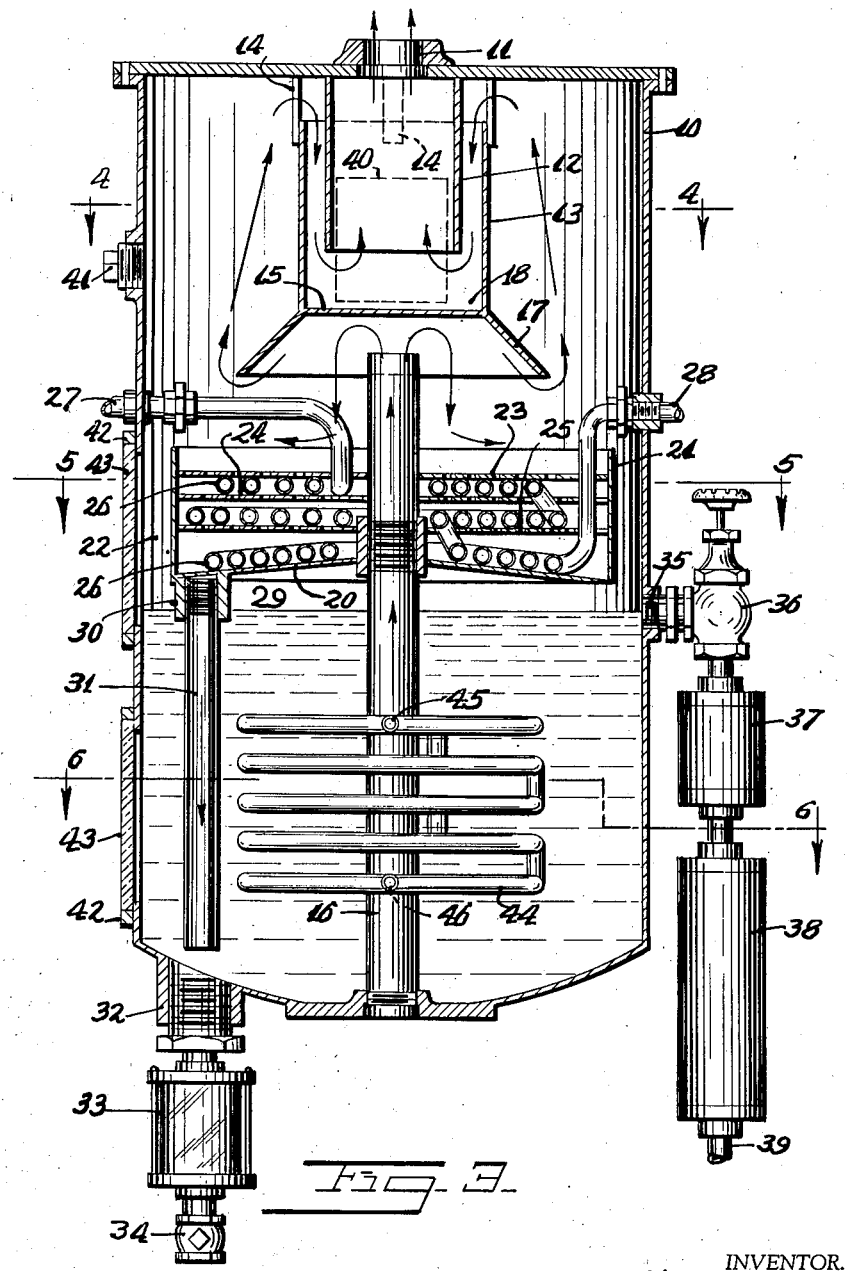

July 11, 1944.  E. J. BEACH  2,353,138
OIL, MOISTURE, AND GAS SEPARATOR
Filed July 18, 1942  3 Sheets-Sheet 3

INVENTOR.
Edward J. Beach
BY
ATTORNEY

Patented July 11, 1944

2,353,138

UNITED STATES PATENT OFFICE 2,353,138

OIL, MOISTURE, AND GAS SEPARATOR

Edward J. Beach, Brooklyn, N. Y.

Application July 18, 1942, Serial No. 451,437

3 Claims. (Cl. 196—16)

This invention relates to new and useful improvements in an oil, moisture and gas separator.

The invention particularly proposes a separator as mentioned, which is designed for removing the moisture, gas and foreign substances from the lubricating and sealing medium of high vacuum pumps, such as for example, the pumps disclosed in my U. S. Patents, No. 2,200,198, granted May 7, 1940, and No. 2,283,033, granted May 12, 1942.

An important object of the new separator is the effective and efficient removal of moisture which may be drawn into the pump during its operation and which mixes with the lubricating medium.

Another object of the invention resides in effectively and efficiently removing dirt and grit and other foreign matter drawn into the pump with incoming gases, from the lubricating and sealing medium.

Still another object of the invention resides in so constructing the separator that the lubricating and sealing medium will be spread into a very thin film which constantly changes its surface and becomes thinner as it travels from the center of the separator outwards and so effectively releases the moisture and gases which it may hold.

Still another object of the invention resides in causing the thinned lubricating and sealing medium referred to above to pass through one or more perforated plates and to drip upon one or more heating coils which act to drive off residual moisture and gases.

The invention also contemplates the provision of a pump so designed as to receive and collect the heavier particles and impurities so that they may be easily removed when desired.

The invention also proposes the provision of additional large surface heating coils located within the already treated lubricating and sealing medium at a point immediately before its discharge from the separator to further drive off any moisture or gases which may still be retained by it.

The invention also proposes the provision of a filter and a cooling device in the discharge line from the new separator to insure delivery of the lubricating and sealing medium to the pump in excellent condition.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an oil, moisture and gas separator constructed in accordance with this invention.

Fig. 2 is a plan view of Fig. 1.

Fig. 3 is an enlarged vertical sectional view of the separator, this view being as though taken on the line 3—3 of Fig. 4.

Fig. 5 is a horizontal sectional view taken on the line 5—5 of Fig. 3.

Figure 4:
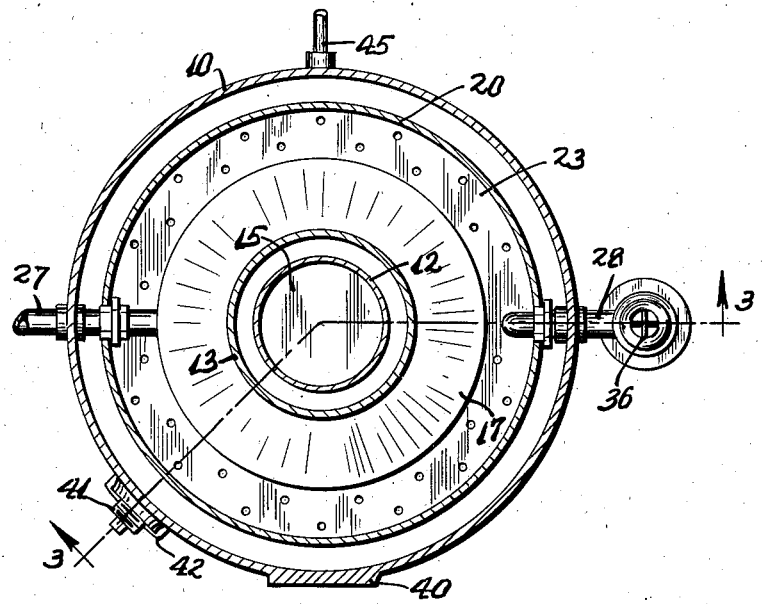
Fig. 4 is a horizontal sectional view taken on the line 4—4 of Fig. 3.
Figure 6:
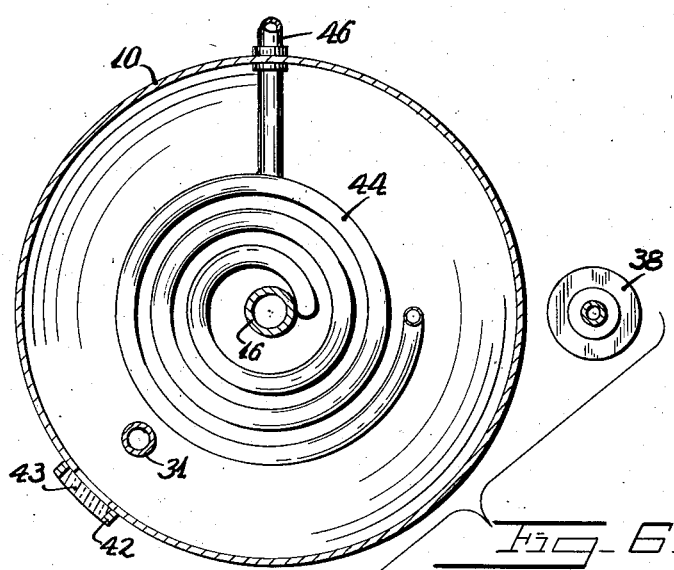
Fig. 6 is a horizontal sectional view taken on the line 6—6 of Fig. 3.

The oil, moisture and gas separator, in accordance with this invention, includes a casing 10 having a top air-gas discharge 11 shielded with alternating baffles 12 and 13. The baffles are of tubular form. The baffle 12 is attached at its top edge portion to the bottom face of the top wall of the casing 10. The baffle 13 is spaced down slightly from the bottom face of the top wall of the casing 10 and is supported by several support strips 14. The baffle 13 is engaged over the bottom portion of the baffle 12. The bottom end of the baffle 13 is closed by a wall 15. The construction is such that air, moisture and gases may pass through the baffles, as indicated by the arrow lines, and discharge from the said discharge 11.

A vertical oil-water-air inlet pipe 16 is disposed in the casing 10 and extends upwards from the bottom of the casing. In the particular design of the separator disclosed, the casing 10 is of cylindrical form and the oil-air-water inlet pipe 16 is located axially in the casing. The bottom end of the pipe 16 is adapted to be connected with the high vacuum pump similar to the arrangements shown in my prior patents above referred to. The top end of the pipe 16 terminates a slight distance below the said closed end 15 of the baffle 13. A cone shaped baffle 17 is supported stationarily slightly above the top of the inlet pipe 16. More particularly, the cone shaped baffle 17 is supported upon the edges of the said closed end 15. A small drain opening 18 is formed in the bottom portion of the baffle 13 immediately above the closed end 15 so that any moisture collecting on the top of the closed end 15 may drain into the casing 10.

An open top container 20 surrounds the pipe 16 and is spaced slightly downwards from the top end of said pipe 16. This container 20 is also spaced slightly below the said cone shaped baffle 17. The side walls 21 of the container 20 are spaced slightly inwards of the side walls of the casing 10 so that there is a passage 22 between these parts. A plurality of vertically spaced transverse perforated plates 23, 24 and 25 are mounted in and across the said open top container 20. A plurality of heating coils 26 are located beneath the said perforated plates 23, 24 and 25. The heating coils 26 are continuous, though they are divided into separate units, which are located beneath the perforated plates as illustrated particularly in Fig. 3. The heating coil 26 is provided with an inlet tube 27 and a discharge tube 28 extending from the side walls of the casing 10 through which heating fluid or substances may be circulated through the heating coil 26.

The open top container 20 has a false conical shaped bottom 29 inclined downwards and outwards from its center. At one point the bottom 29 has a discharge boss 30 which supports a guide pipe 31 for the lubricating and sealing medium. This guide pipe 31 terminates a short distance above the bottom of the casing 10 and directly above this a discharge boss 32 on the bottom of the casing 10. This discharge boss 32 connects with a visible water glass 33, which in turn connects with a drain valve 34. The boss 32, water glass 33, and drain valve 34 are in the nature of a sump drain for receiving and holding and discharging foreign particles from the lubricating and sealing medium which settles down due to gravity. A discharge line 35 connects with one side of the casing 10 at a point slightly beneath the bottom of the open top container 20. This discharge line 35 is provided with a control valve 36, a filter 37, and a cooler 38. The cooler 38 is provided with a tube 39 which is intended to connect with the high vacuum pump similar to the construction described in my prior patents.

The casing 10 is provided with a rectangular projecting portion 40 for a name plate. At one side, the casing 10 is provided with a plugged opening 41 which is located at a top point on the casing. The casing 10 is also provided with several glass gauge frames 42 and glasses 43 through which the medium within the casing may be inspected.

A residual moisture heating coil 44 is located within the bottom portion of the casing 10 coaxially of the tube 16. This heating coil 44 is shown to comprise five horizontally spaced but connected spiral portions. The coil 44 has an inlet 45 and a discharge 46 which extends through one of the sides of the casing 10. It is intended that heating fluids or substances be passed through the coil 44 during the operation of the separator.

The operation of the separator is as follows.

The lubricating aid sealing medium from the pump passes up through the vertical oil-water-air inlet pipe 16 and strikes against the wall 15 and spreads as indicated by the arrows. The air continues upwards around the cone shaped baffle 17, while the moisture and sealing medium is deflected downwards and strikes against the uppermost perforated plate 23 in the open top container 20. Subsequently, it spreads and becomes thinner and thinner as it travels outwards from the center of the container 20 to its circumference.

The spread out sealing medium drips through the perforations of the top plate 20 and over the adjacent coils of the heating unit 26. Then the sealing medium spreads further upon the second perforated plate 24 and drips through the perforations in the second plate and upon the turns of the coil 26. It then engages onto the third perforated plate 25 and spreads and thins out further and then drips through the perforations upon the bottom coils of the heating coil 26. The thinning of the lubricating and sealing medium, and heating drives off the volatile gases and the moisture. The gases and moisture rise and are caught up by the current of air and are finally discharged through the top discharge 11.

The sealing medium reaching the bottom wall 29 will be caused to flow outwards and discharge through the guide pipe 32. The medium discharges over and into sump 32, 33, 34, which collects the grit and foreign particles which settle out. The cleaned sealing medium accumulates in the bottom of the casing 10. This accumulation is being constantly heated by the heating coil 44 and this heat drives off any residual moisture and gases. The cleaned sealing medium then discharges through the discharge line 35 and is filtered by the filter 37 and cooled by the cooler 38. It is now ready to re-enter the high vacuum pump.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An oil, moisture and gas separator having a casing with a top air-gas discharge and a vertical oil-water-air inlet pipe in and extending upwards from the bottom of said casing with its top end spaced from said top discharge with a discharge line extending from the side of said casing at a point spaced materially below the top end of said inlet pipe, an open top container mounted concentrically upon said inlet pipe at a point between said air inlet pipe and the discharge line and formed with a guide pipe leading from the interior thereof, a plurality of vertically spaced perforated plates mounted within said container and through which oil containing water which from the top of said inlet pipe is adapted to filter, and a continuous heating coil having sections resting on each of said perforated plates to heat the oil passing through said plates to drive the water from the oil while passing through said plates.

2. An oil, moisture and gas separator having a casing with a top air-gas discharge and a vertical oil-water-air inlet pipe in and extending upwards from the bottom of said casing with its top end spaced from said top discharge with a discharge line extending from the side of said casing at a point spaced materially below the top end of said inlet pipe, an open top container mounted concentrically upon said inlet pipe at a point between said air inlet pipe and the discharge line and formed with a guide pipe leading from the interior thereof, a plurality of vertically spaced perforated plates mounted within said container and through which oil containing water which from the top of said inlet pipe is adapted to filter, and a continuous heating coil having sections resting on each of said perforated plates to heat the oil passing through said plates to drive the water from the oil while passing through said plates, said container having an inclined bottom wall for directing the oil after passing through said perforated plates into said guide pipe.

3. An oil, moisture and gas separator having a casing with a top air-gas discharge and a vertical oil-water-air inlet pipe in and extending upwards from the bottom of said casing with its top end spaced from said top discharge with a discharge line extending from the side of said casing at a point spaced materially below the top end of said inlet pipe, an open top container mounted concentrically upon said inlet pipe at a point between said air inlet pipe and the discharge line and formed with a guide pipe leading from the interior thereof, a plurality of vertically spaced perforated plates mounted within said container and through which oil containing water which from the top of said inlet pipe is adapted to filter, and a continuous heating coil having sections resting on each of said preforated plates to heat the oil passing through said plates to drive the water from the oil while passing through said plates, said container having the top edges of its side walls disposed above the topmost perforated plate to catch the oil if it discharges from the top of said inlet pipe faster than it passes through said perforated plates.

EDWARD J. BEACH.